US008068611B2

(12) United States Patent
Yamagishi et al.

(10) Patent No.: US 8,068,611 B2
(45) Date of Patent: Nov. 29, 2011

(54) METHOD OF PLAYING BROADCAST PROGRAM CONTENTS USING ENCRYPTION AND DECRYPTION TECHNIQUES

(75) Inventors: Yoshikazu Yamagishi, Tokyo (JP);
Ryosuke Takahashi, Tokyo (JP);
Yoshiyuki Takagi, Nagoya (JP)

(73) Assignee: Buffalo Inc., Minami-ku (JP)

( * ) Notice: Subject to any disclaimer, the term of this patent is extended or adjusted under 35 U.S.C. 154(b) by 875 days.

(21) Appl. No.: 12/111,085

(22) Filed: Apr. 28, 2008

(65) Prior Publication Data

US 2008/0266466 A1 Oct. 30, 2008

(30) Foreign Application Priority Data

Apr. 27, 2007 (JP) ................................. 2007-118253

(51) Int. Cl.
*H04L 9/00* (2006.01)
*H04L 29/06* (2006.01)
(52) U.S. Cl. ....................................... 380/277; 713/150
(58) Field of Classification Search .................... 380/277
See application file for complete search history.

(56) References Cited

U.S. PATENT DOCUMENTS

| 6,832,319 | B1 * | 12/2004 | Bell et al. ....................... 713/193 |
| 7,007,163 | B2 * | 2/2006 | Tardo et al. .................... 713/164 |
| 7,454,628 | B2 * | 11/2008 | Sako et al. ..................... 713/193 |
| 7,472,415 | B2 * | 12/2008 | Saitoh et al. ..................... 726/20 |
| 7,869,595 | B2 * | 1/2011 | Furukawa et al. ............. 380/201 |
| 2003/0026425 | A1 * | 2/2003 | Okamoto et al. .............. 380/255 |
| 2004/0003281 | A1 * | 1/2004 | Sonoda et al. ................. 713/200 |
| 2004/0088180 | A1 * | 5/2004 | Akins, III .......................... 705/1 |
| 2004/0151179 | A1 * | 8/2004 | Andre et al. ................... 370/392 |
| 2005/0160266 | A1 * | 7/2005 | Choi .............................. 713/168 |
| 2005/0213234 | A1 * | 9/2005 | Senshu et al. ................... 360/15 |
| 2007/0250872 | A1 * | 10/2007 | Dua ................................. 725/81 |
| 2008/0226078 | A1 * | 9/2008 | Gabryjelski et al. ........... 380/277 |

FOREIGN PATENT DOCUMENTS

JP 2004-173027 A 6/2004

* cited by examiner

*Primary Examiner* — Vivek Srivastava
*Assistant Examiner* — Jayesh Jhaveri
(74) *Attorney, Agent, or Firm* — Oblon, Spivak, McClelland, Maier & Neustadt, L.L.P.

(57) ABSTRACT

A method is provided of playing a broadcast program content, which includes: (a) producing a combination-dependent unique key which is unique to a combination of a tuner unit and a computer unit; and (b) in response to issuance of a real-time play command or a recorded-video playback command from a user, playing a broadcast program content in real-time after transmission thereof from the tuner unit to the computer unit, or playing back recorded data after retrieval thereof from a data storage. In an illustrative embodiment, the produced combination-dependent unique key is outputted into an encryptor of the tuner unit for encryption, and the encrypted digital data is inputted into the computer unit. A decryptor of the computer unit is caused to attempt decryption of the encrypted digital data, using the produced combination-dependent unique key.

22 Claims, 4 Drawing Sheets

METHOD OF PLAYING BROADCAST PROGRAM CONTENTS USING ENCRYPTION AND DECRYPTION TECHNIQUES

CROSS-REFERENCE TO RELATED APPLICATIONS

The present application is based on and claims the benefit of priority from Japanese Patent Application No. 2007-118253 filed Apr. 27, 2007, the content of which is incorporated herein by reference in its entirety.

BACKGROUND

1. Field of the Invention

The invention relates generally to techniques of playing a broadcast program content with enhanced security, and more particularly to improvements of techniques of playing a broadcast program content in an environment where a computer unit allows the broadcast program content to be viewed and/or listened to, with a tuner unit detachably coupled to the computer unit via an interface.

2. Description of the Related Art

In recent years, digital broadcasting has become more popular owing to satellite or terrestrial broadcasting. Digital broadcasting programs distributed by satellite broadcasting or the like are viewed and/or listened to, for example, in the following fashion:

Firstly, a radio wave is received by an antenna, and the received radio wave is frequency-converted by a converter. Secondly, the frequency-converted signal, after channel selection by a tuner, is decoded.

Thereafter, there is extracted from the decoded signal a transport stream (hereinafter, referred to as "MPEG2-TS") which is in the form of a coded bit-stream compliant with the MPEG-2 standard. The extracted MPEG2-TS is formatted to contain various kinds of contents, such as images or still or moving pictures, sound, or program guides.

The MPEG2-TS, after decoded, is further converted to an analog signal, resultantly allowing a viewer to view and/or listen to a program content via an image output device such as a TV monitor or an LCD (Liquid Crystal Display) monitor and/or a sound output device such as a speaker.

In addition, it has been popular recently to add a tuner for reception of TV broadcast, on a personal computer (hereinafter, abbreviated as "PC") in a detachable manner, to thereby allow a broadcast program content to be displayed on an LCD display of the PC for viewing, and allow a broadcast program content to be recorded in a storage device, such as an HDD (Hard Disk Drive), which is coupled to the PC, whether built-in or add-on.

In the industry of digital broadcasting, a broadcast program content is distributed in a digital format, without any significant reduction in picture and/or sound quality during signal propagation. This makes it easier to fully duplicate such a broadcast program content, which, in turn, runs the risk of copyright infringement.

In addition, it is general for a PC to easily accommodate various kinds of external devices by connection, at risk of illegal copying of a broadcast program content which has been received by the PC. Moreover, when a tuner and a PC are detachably coupled to each other, data indicative of a broadcast program content, during transmission from the tuner to the PC, is risky of being intercepted or tapped through an interface of the PC.

It has been that a broadcast program content is encrypted for providing copyright protection thereto, prior to reception by a PC from a tuner which has been detachably coupled to the PC.

This approach can prevent illegal viewing and duplication of a broadcast program content by virtue of encryption thereof, even if data indicative of the broadcast program content is tapped from an interface of a PC with a tuner, during transmission of the broadcast program content from the tuner to the PC. Japanese Patent Application Publication No. 2004-173027 discloses an exemplary conventional technique for encrypting a broadcast program content.

BRIEF SUMMARY

According to some aspects of the present invention, a method is provided of playing a broadcast program content, which includes: (a) producing a combination-dependent unique key which is unique to a combination of a tuner unit and a computer unit; and (b) in response to issuance of a real-time play command or a recorded-video playback command from a user, playing a broadcast program content in real-time after transmission thereof from the tuner unit to the computer unit, or playing back recorded data after retrieval thereof from a data storage.

In an illustrative embodiment, at an exemplary first step, a tuner-dependent unique key is captured from a tuner unit, wherein the tuner-dependent unique key is unique to the tuner unit, a computer-dependent unique key is obtained which is unique to the computer unit, and the combination-dependent unique key is produced from the tuner-dependent unique key and the computer-dependent unique key.

At an exemplary second step, the produced combination-dependent unique key is outputted into an encryptor of the tuner unit for encryption, and the encrypted digital data is inputted into the computer unit. The encrypted digital data is data which has been outputted from the encryptor in response to the output of the combination-dependent unique key to the encryptor. Then, a decryptor of the computer unit is caused to attempt decryption of the inputted encrypted digital data, using the produced combination-dependent unique key. It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION

1. General Overview

According to a first aspect of the invention, a method, implemented by a computer unit, is provided for playing a broadcast program content, in an environment where the computer unit allows the broadcast program content to be viewed and/or listened to, with a tuner unit detachably coupled to the computer unit via an interface, wherein the tuner unit is configured to include:

a wireless or wired receiver arranged to receive a broadcast signal representative of the broadcast program content;

an encryptor arranged to encrypt the broadcast signal received by the receiver, according to an algorithm dependent on a designated key, and to output the encrypted broadcast signal as encrypted data; and a key storage arranged to store a tuner-dependent unique key which is an encryption key unique to the tuner unit, and wherein the computer unit is configured to include:

a decryptor arranged to decrypt the encrypted data according to an algorithm dependent on a designated key;

a data storage arranged to store data; and a playing device arranged to play data, the method comprising the steps of:

producing a combination-dependent unique key which is unique to a combination of the tuner unit and the computer unit; and in response to issuance of a real-time play command from a user, playing the broadcast program content in real-time after transmission thereof from the tuner unit to the computer unit, wherein the step of producing includes:

capturing the tuner-dependent unique key from the tuner unit via the interface;

obtaining a computer-dependent unique key which is unique to the computer unit; and producing the combination-dependent unique key, from the tuner-dependent unique key and the computer-dependent unique key, the step of playing includes:

in response to issuance of the real-time play command, implementing the step of producing;

outputting to the encryptor via the interface, the combination-dependent unique key which has resulted from the implementation of the step of producing;

inputting via the interface, encrypted digital data which has been outputted from the encryptor in response to the output of the combination-dependent unique key to the encryptor;

causing the decryptor to attempt decryption of the inputted encrypted digital data, using the produced combination-dependent unique key; and outputting to the playing device, a decrypted version of the digital data resulting from successful decryption by the decryptor.

For the purpose of, for example, providing a broadcast program content with increased copyright-protection, in an environment where the broadcast program content is viewed with a tuner unit being detachably coupled to a computer unit, it is desirable to increase security of data transmitted from the tuner unit to the computer unit, to allow a hardware environment or arrangement where the computer unit receives a broadcast signal via the tuner unit, to be kept unchanged. The hardware environment refers to, for example, a hardware combination (i.e., combined hardware) of a computer unit and a tuner unit both used for reception of a broadcast signal.

Further, the present inventor has obtained, as a result of his study, such findings that it is more advantageous to play back previously recorded data of a broadcast program content, using the same combination of a tuner unit and a computer unit as that used for previous production of the recorded data, for the purpose of preventing data indicative of the broadcast program content from being intercepted or tapped from an interface of the computer unit.

Based on the findings stated above, the method according to the first aspect of the invention is for increasing security of data transmitted from a tuner unit to a computer unit, and/or for allowing a hardware environment or arrangement where a computer unit receives a broadcast signal via a tuner unit, to be kept unchanged, both in an environment where a broadcast program content is viewed and/or listened to, with the tuner unit being detachably coupled to the computer unit.

Illustratively, upon practice of the method according to the first aspect of the invention, a tuner unit operates such that digital data indicative of a broadcast program content is encrypted using an encryption key uniquely assigned to a combination of the tuner unit and a computer unit existing at that moment, and the encrypted digital data is transmitted from the tuner unit to the computer unit.

In addition, upon practice of this method, the computer unit operates such that an encrypted version of a broadcast program content which is just about to be played in real-time (i.e., an on-the-air program to be played in real-time) is decrypted using an encryption key uniquely assigned to a combination of the computer unit and a tuner unit existing at that moment, provided that the encryption key is identical with an encryption key that was used by the tuner unit to encrypt the same broadcast program content.

This method, as a result, prevents the encrypted version of digital data from being decrypted and played in real-time, unless any coincidence is found between an encryption key that was used to encrypt the digital data (the key is produced so as to correspond to a combination of a tuner unit and a computer unit during reception of the digital data), and an encryption key which will be used in an attempt to decrypt the encrypted digital data (the key is produced so as to correspond to a combination of the tuner unit and the computer unit existing during real-time playing of the digital data).

This method, therefore, allows a combination of a tuner unit and a computer unit, that is to say, a hardware environment where the computer unit receives a broadcast program content via the tuner unit and plays the received content in real-time, to be kept unchanged.

In other words, this method maintains the identity of a counterpart device which is used together with one of a tuner unit and a computer unit for receiving and playing a broadcast program content in real-time.

This method, as a result, makes it essential to couple a tuner unit and a computer unit to each other in receiving and playing a broadcast program content in real-time, and allows a counterpart device which is to be used together with one of the tuner unit and the computer unit, to be uniquely determined, irrespective of the fact that the tuner unit and the computer unit have been designed to allow them to be physically separated.

This method, therefore, makes it easier to increase security of data transmitted from a tuner unit to a computer unit, and to maintain the identity of a hardware environment where the computer unit receives a broadcast signal via the tuner unit and plays it in real-time, to the same degree as if the tuner unit and the computer unit were designed to be always physically non-detachable, that is to say, a combined tuner/computer unit.

It is added that the term "computer unit" used herein may be interpreted to mean, for example, a desktop computer (e.g., a personal computer), a portable computer (e.g., a PDA (Personal Data Assistant), a portable telephone), or the like, unless otherwise defined herein.

The term "computer unit" may be also interpreted to mean, for example, a general-purpose device using a computer as an engine for different purposes, a specific-purpose device using a computer as an engine for a specific purpose, or the like, unless otherwise defined herein.

The term "broadcast program" used herein may be interpreted to mean, for example, a TV broadcast program, a radio broadcast program, or the like, unless otherwise defined herein.

According to a second aspect of the invention, a method, implemented by a computer unit, is provided for playing a broadcast program content, in an environment where the computer unit allows the broadcast program content to be viewed and/or listened to, with a tuner unit detachably coupled to the computer unit via an interface, wherein the tuner unit is configured to include:

a wireless or wired receiver arranged to receive a broadcast signal representative of the broadcast program content;

an encryptor arranged to encrypt the broadcast signal received by the receiver, according to an algorithm dependent on a designated key, and to output the encrypted broadcast signal as encrypted data; and a key storage arranged to store a tuner-dependent unique key which is an encryption key unique to the tuner unit, and wherein the computer unit is configured to include:

a decryptor arranged to decrypt the encrypted data according to an algorithm dependent on a designated key;

a data storage arranged to store data; and a playing device arranged to play data, the method comprising the steps of:

producing a combination-dependent unique key which is unique to a combination of the tuner unit and the computer unit;

in response to issuance of a record command from a user, storing digital data which has been inputted from the tuner unit, in the data storage, as recorded data; and in response to issuance of a recorded-video playback command from the user, playing back the recorded data after retrieval thereof from the data storage, wherein the step of producing includes:

capturing the tuner-dependent unique key from the tuner unit via the interface;

obtaining a computer-dependent unique key which is unique to the computer unit; and producing the combination-dependent unique key, from the tuner-dependent unique key and the computer-dependent unique key, the step of storing includes:

in response to issuance of the record command, implementing the step of producing;

outputting to the encryptor via the interface, the combination-dependent unique key which has resulted from the implementation of the step of producing;

inputting via the interface, encrypted digital data which has been outputted from the encryptor in response to the output of the combination-dependent unique key to the encryptor; and storing the inputted digital data in the data storage, as the recorded data, wherein the step of playing includes:

in response to issuance of the recorded-video playback command, retrieving the recorded data from the data storage, and implementing the step of producing;

causing the decryptor to attempt decryption of the inputted retrieved recorded-data, using the combination-dependent unique key produced as a result of the implementation of the step of producing; and outputting to the playing device, a decrypted version of the recorded data resulting from successful decryption by the decryptor.

Illustratively, upon practice of the method according to the second aspect of the invention, a tuner unit operates such that digital data indicative of a broadcast program content is encrypted using an encryption key uniquely assigned to a combination of the tuner unit and a computer unit existing at that moment, and the encrypted digital data is transmitted from the tuner unit to the computer unit and then is stored in the computer unit as recorded video data.

In addition, upon practice of this method, the computer unit operates such that an encrypted version of a broadcast program content which has been previously stored and which is just about to be played is decrypted using an encryption key uniquely assigned to a combination of the computer unit and a tuner unit existing at that moment, provided that the encryption key is identical with an encryption key that was used by the tuner unit to encrypt the same broadcast program content.

This method, as a result, prevents an encrypted version of previously-recorded digital data from being decrypted and used for playing back the recorded data, unless any coincidence is found between an encryption key that was used to encrypt the digital data (the key is produced so as to correspond to a combination of a tuner unit and a computer unit during recording or storing of the digital data), and an encryption key which will be used in an attempt to decrypt the encrypted digital data (the key is produced so as to correspond to a combination of the tuner unit and the computer unit during playback of the recorded digital data).

This method, therefore, allows a combination of a tuner unit and a computer unit, that is to say, a hardware environment where the computer unit receives a broadcast program content via the tuner unit and records the received broadcast program content, and where the recorded broadcast program content is played back, to be kept unchanged.

In other words, this method maintains the identity of a counterpart device which is used together with one of a tuner unit and a computer unit for receiving and recording a broadcast program content, and playing back the recorded broadcast program content.

This method, as a result, similarly with the method according to the first aspect of the invention described above, makes it essential to couple a tuner unit and a computer unit to each other in receiving and recording a broadcast program content, and playing back the recorded broadcast program content, and allows a counterpart device which is to be used together with one of the tuner unit and the computer unit, to be uniquely determined, irrespective of the fact that the tuner unit and the computer unit have been designed to allow them to be physically separated.

This method, therefore, similarly with the method according to the first aspect of the invention described above, makes it easier to increase security of data transmitted from a tuner unit to a computer unit, and to maintain the identity of a hardware environment where the computer unit receives and records a broadcast program content via the tuner unit and plays back the recorded broadcast program content, to the same degree as if the tuner unit and the computer unit were designed to be always physically non-detachable, that is to say, a combined tuner/computer unit.

It is added that the term "recorded-video playback" used herein may be interpreted to mean recorded-video playback in a narrow sense or recorded-video playback in a broad sense, unless otherwise defined herein.

The term "recorded-video playback in a narrow sense" may be also interpreted to mean, for example, a mode in which a particular program, upon completion of on-the-air or real-time broadcasting, is played back entirely using recorded data, unless otherwise defined herein.

In contrast, the term "recorded-video playback in a broad sense" used herein may be interpreted to also mean, for example, so-called time-shift playback which is a mode in which playing of a particular program is paused temporarily during on-the-air broadcasting, in which the program is then recorded sequentially only during the pause period, and in which only an intermediate portion of the program (i.e., a part of the program which has been recorded during the pause period) is played back using recorded data.

2. Illustrative Embodiments

According to the invention, the following modes are provided as illustrative embodiments of the invention.

According to a first mode of the method according to the first aspect of the invention as described above, there is provided a method wherein the step of playing includes a step of implementing the step of producing, during only an initial part of a length of a real-time play period corresponding to a single real-time play command issued from the user, and of reserving the combination-dependent unique key produced as a result of the implementation of the step of producing, until expiration of the real-time play period.

This method allows the combination-dependent unique key to be produced during only an initial part of a length of a real-time play period, and to be reserved until expiration of the real-time play period.

This method, as a result, eliminates or reduces a need for frequent production cycles of the combination-dependent unique key during a series of a real-time play period.

According to a second mode of the method according to the first aspect of the invention as described above, there is provided a method wherein the step of playing includes a step of implementing the step of producing periodically, during only an initial part of a length of a real-time play period corresponding to a single real-time play command issued from the user, to thereby produce the combination-dependent unique key periodically.

This method allows the combination-dependent unique key to be produced periodically during a series of a real-time play period.

This method, as a result, allows an unexpected event to be detected that a tuner unit and a computer unit are physically separated from each other after a series of a real-time play period has started, or allows an unexpected event to be detected that the identity of a combination of a tuner unit and a computer unit both actually used has changed after a series of a real-time play period has started.

This method may be practiced in an exemplary manner in which, once such an unexpected event has been detected, a current cycle of a real-time play is terminated.

According to a third mode of the method according to the second aspect of the invention as described above, there is provided a method wherein the step of playing includes a step of implementing the step of producing, during only an initial part of a length of a recorded-video playback period corresponding to a single recorded-video playback command issued from the user, and of reserving the combination-dependent unique key produced as a result of the implementation of the step of producing, until expiration of the recorded-video playback period.

This method allows the combination-dependent unique key to be produced during only an initial part of a length of a recorded-video playback period, and to be reserved until expiration of the recorded-video playback period.

This method, as a result, eliminates or reduces a need for frequent production cycles of the combination-dependent unique key during a series of a recorded-video playback period.

According to a fourth mode of the method according to the second aspect of the invention as described above, there is provided a method wherein the step of playing includes a step of implementing the step of producing periodically, during only an initial part of a length of a recorded-video playback period corresponding to a single recorded-video playback command issued from the user, to thereby produce the combination-dependent unique key periodically.

This method allows the combination-dependent unique key to be produced periodically during a series of a real-time play period.

This method, as a result, allows an unexpected event to be detected that a tuner unit and a computer unit are physically separated from each other after a series of a recorded-video playback period has started, or allows an unexpected event to be detected that the identity of a combination of a tuner unit and a computer unit both actually used has changed after a series of a recorded-video playback period has started.

This method may be practiced in an exemplary manner in which, once such an unexpected event has been detected, a current cycle of a recorded-video playback is terminated.

According to a fifth mode of the method according to the first or second aspect of the invention as described above, or any one of the first through fourth modes as described above, there is provided a method wherein the computer unit is configured to have a CPU (Central Processing Unit) and a MAC (Media Access Control), the CPU has been assigned a CPU-dependent unique ID which is unique to the CPU, the MAC has been assigned a MAC address which is unique to the MAC, and the step of producing includes a step of producing the computer-dependent unique key, from at least one of the CPU-dependent unique ID and the MAC address.

This method allows the computer-dependent unit key, which is indicative of the identity of a computer unit, to be produced using at least one of a CPU-dependent unique ID and a MAC address both of which have been previously assigned to the computer unit.

The production of the computer-dependent unique key using both of the CPU-dependent unique ID and the MAC address would make it easier to define the identity of a computer unit more precisely than the production of the computer-dependent unique key using only one of the CPU-dependent unique ID and the MAC address. The production of the computer-dependent unique key using both of the CPU-dependent unique ID and the MAC address would also make it easier to maintain, with increased certainty, the identity of a hardware environment in which a broadcast program content (i.e., a combination of a tuner unit and a computer unit which are used in electrical connection with each other) is played.

According to a sixth mode of the method according to the first or second aspect of the invention as described above, or any one of the first through fifth modes as described above, there is provided a method wherein the broadcast signal is formulated such that a content information signal is embedded in the broadcast signal which is representative of content information that relates to the broadcast program content defined by the broadcast signal, the method further comprises a step of determining whether or not there is a need for causing the encryptor to encrypt the broadcast signal prior to transmission of the broadcast signal from the tuner unit into the computer unit, the step of determining includes:

extracting the content information signal from the broadcast signal; and determining whether or not there is the need, based on the extracted content information signal.

According to a seventh mode of the method according to the sixth mode, there is provided a method wherein the content information signal is formulated to include a copy management information signal which has been embedded in the broadcast signal, the copy management information signal being representative of a status as to whether or not a user is authorized to copy the broadcast program content, or a number or count of times that a user is authorized to copy the broadcast program content.

According to an eighth mode of the method according to the seventh mode, there is provided a method wherein the broadcast signal is formulated to include a transport stream, and the copy management information signal is formulated to include a CCI (Copy Control Information) signal which has been previously embedded in the transport stream.

According to a ninth mode of the method according to any one of the sixth through eighth modes, there is provided a method wherein the step of playing includes a step of, upon determination that there is not the need, inputting digital data outputted via the interface from the tuner unit in a non-encrypted format, and outputting the inputted digital data to the playing device, without implementing the step of producing.

According to a tenth mode of the method according to the second aspect of the invention, the third mode or the fourth mode, there is provided a method wherein the step of playing back includes determining whether or not recorded data that has been stored in the data storage has been encrypted, and, upon determination that the recorded data has been encrypted, retrieving the recorded data from the data storage and outputting the retrieved recorded-data to the playing device, without implementing the step of producing or causing the decryptor to decrypt the recorded data.

According to an eleventh mode of the invention, there is provided a computer-executable program which, when executed by a computer, effects the method according to any one of the first and second aspects and the first through tenth modes.

This program, upon executed by a computer, would provide basically the same functions and effects, according to basically the same principle, as the method according to any one of the first and second aspects and the first through tenth modes.

The term "program" may be interpreted as including not only a set of instructions executed by a computer to perform the function(s) of the program, but also and associated files, data or the like to be processed according to the instructions.

In addition, the term "program" may be interpreted as, for example, a program which achieves the intended purpose(s) by being solely executed by a computer, or a program which achieves the intended purpose(s) by being executed by a computer together with another program or other programs. In the latter case, the term "program" may be constructed mainly as data.

According to a twelfth mode of the invention, there is provided a computer readable medium having stored therein a computer executable program which, when executed by a computer, implements the method according to the eleventh mode of the invention.

The program having stored in this medium, upon executed by a computer, would provide basically the same functions and effects, according to basically the same principle, as the method according to any one of the first and second aspects and the first through tenth modes.

The "computer-readable medium" as stated in this specification may be realized in any one of a variety of types, including a magnetic recording medium, such as a flexible-disc, an optical recording medium, such as a CD and a CD-ROM, an optical-magnetic recording medium, such as an MO, an un-removable storage, such as a ROM, for example.

According to a thirteenth mode of the invention, there is provided a computer unit detachably couple to a tuner unit via an interface for allowing a broadcast program content to be viewed and/or listened to, wherein the tuner unit is configured to include:

a wireless or wired receiver arranged to receive a broadcast signal representative of the broadcast program content;

an encryptor arranged to encrypt the broadcast signal received by the receiver, according to an algorithm dependent on a designated key, and to output the encrypted broadcast signal as encrypted data; and a key storage arranged to store a tuner-dependent unique key which is an encryption key unique to the tuner unit, and wherein the computer unit is configured to include:

a decryptor arranged to decrypt the encrypted data according to an algorithm dependent on a designated key;

a data storage arranged to store data;

a playing device arranged to play data;

a key generator arranged to produce a combination-dependent unique key which is unique to a combination of the tuner unit and the computer unit; and a real-time play processor responsive to issuance of a real-time play command from a user, and arranged to play the broadcast program content in real-time after transmission thereof from the tuner unit to the computer unit, wherein the key generator is arranged to implement:

capturing the tuner-dependent unique key from the tuner unit via the interface;

obtaining a computer-dependent unique key which is unique to the computer unit; and producing the combination-dependent unique key, from the tuner-dependent unique key and the computer-dependent unique key, the real-time play processor is arranged to implement:

in response to issuance of the real-time play command, activating the key generator;

outputting to the encryptor via the interface, the combination-dependent unique key which has resulted from the key generator;

inputting via the interface, encrypted digital data which has been outputted from the encryptor in response to the output of the combination-dependent unique key to the encryptor;

causing the decryptor to attempt decryption of the inputted encrypted digital data, using the produced combination-dependent unique key; and outputting to the playing device, a decrypted version of the digital data resulting from successful decryption by the decryptor.

One of presently preferred embodiments of the invention will be described in more detail by reference to the drawings in which like numerals are used to indicate like elements throughout.

Figure 1:
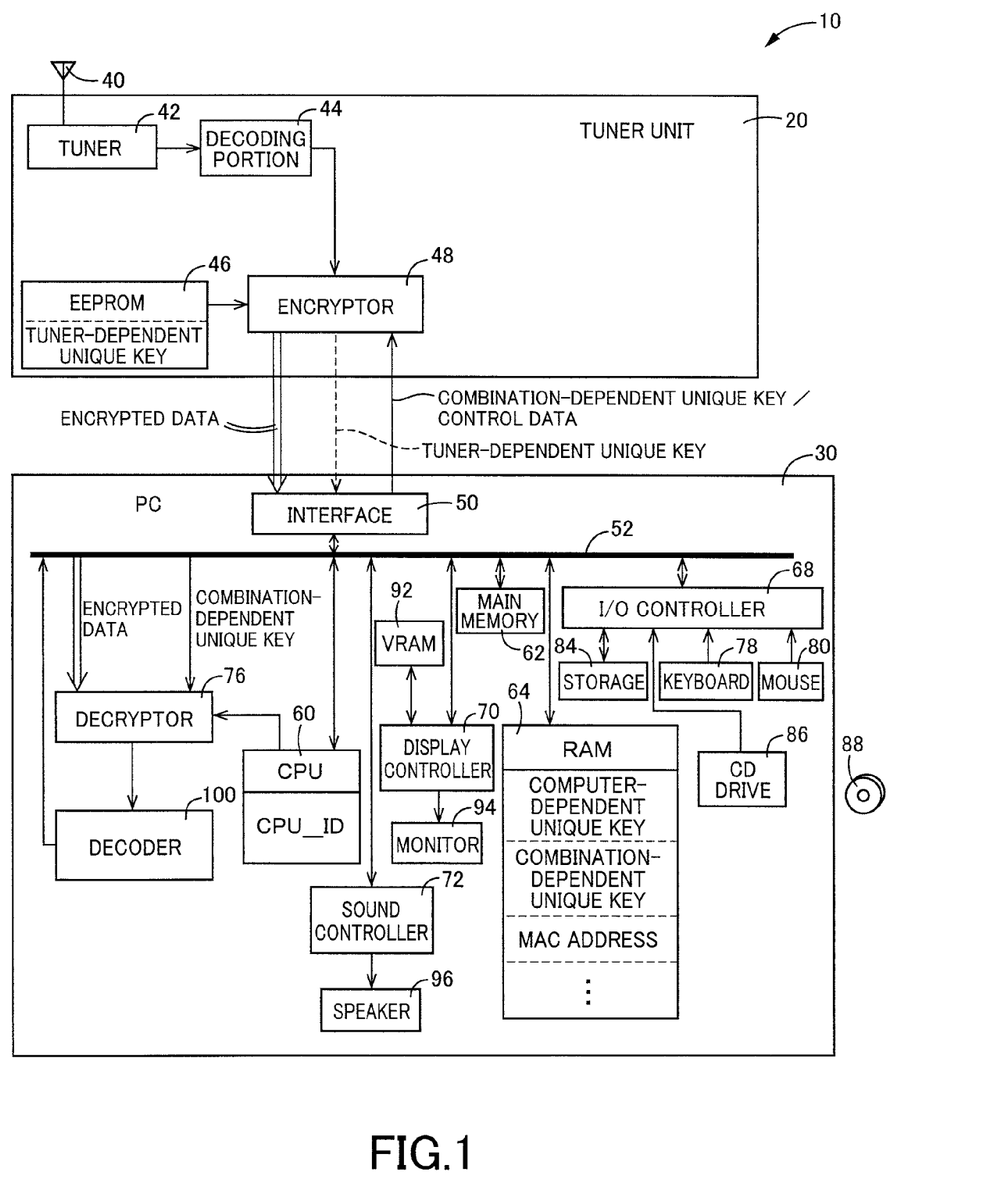
FIG. 1 is a block diagram conceptually illustrating a digital broadcast receiving-system suitably arranged to implement a method of playing a broadcast program content according to an illustrative embodiment of the invention.

FIG. 1 illustrates in a block diagram a digital-broadcast-receiving system (hereinafter, abbreviated as "receiving system") 10 constructed in accordance with one illustrative embodiment of the present invention.

The receiving system 10 is configured to include a tuner unit 20, and a personal computer (hereinafter, abbreviated as "PC") 30. In this regard, the PC 30 constitutes an example of a computer unit.

The tuner unit 20 and the PC 30 are designed to be used together in electrical connection with each other, and to be physically separable from each other. In an example, the tuner unit 20 is purchased separately from the PC 30 and detachably added on the PC 30. More specifically, a USB (Universal Serial Bus) connector (not shown) of the tuner unit 20 is detachably inserted into a USB (Universal Serial Bus) port (not shown) of the PC 30.

The tuner unit 20 and the PC 30 are desirably kept being coupled to each other in use (e.g., playing or recording), so that the identity of the combination can be kept unchanged, for the purpose of providing broadcast program contents with adequate copyright protection, for example.

The tuner unit 20 and the PC 30, however, are physically separable from each other. As such, in the present embodiment, the tuner unit 20 and the PC 30 are designed to perform special signal-processing for preventing a user from intentionally separating the tuner unit 20 and the PC 30 from each other during playing of TV programs or video files, and intentionally losing the identity of the combination during playing of TV programs or video files.

As a result, the tuner unit 20 and the PC 30 are handled as if the tuner unit 20 and the PC 30 were formed as an integral or unitary unit, during playing of TV programs or previously-recorded video files.

The tuner unit 20 is adapted to wirelessly receive a broadcast signal representative of a digital broadcast program content. For this reason, as illustrated in FIG. 1, the tuner unit 20 is configured to include an antenna 40, a tuner 42, and a decoder 44, as is well known.

The antenna 40 is adapted to receive radio waves transmitted from a broadcasting station or a broadcasting satellite for digital broadcast, and transmits signals of the received radio waves to the tuner 42.

The tuner 42 is adapted to receive via the antenna 42 digital broadcast signals and then tune to a desired channel. More specifically, the tuner 42 tunes to a channel which carries and broadcasts one of the digital broadcast signals which represents a user-desired program, and transmits the received signal to the decoder 44.

The decoder 44 is adapted to perform A/D conversion for a signal which has been transmitted from the tuner 42 and which has been previously modulated in a predetermined manner, and then digitally decode the converted signal. The decoder 44 is further adapted to correct a coding error occurring in a transmission path, etc., and generate (further descramble, if necessary) a transport stream (hereinafter, abbreviated as "TS") which is compliant with the Moving Picture Expert Group 2 (MPEG-2) standard. This standard and the "TS" are disclosed in U.S. Pat. No. 7,095,945 which is incorporated hereinto by reference in its entirety.

Figure 2:
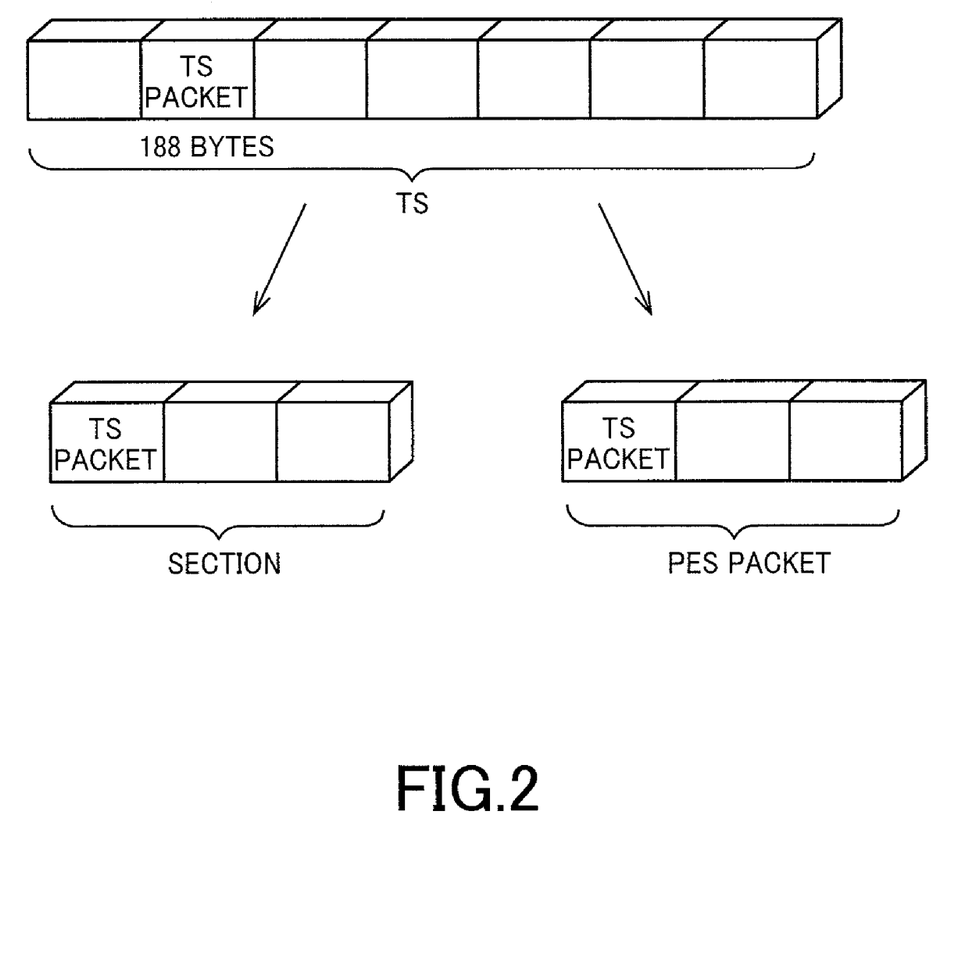
FIG. 2 is a perspective view conceptually illustrating a data structure of a transport stream (TS)

The "TS" is generated by a broadcasting station for providing a digital broadcast program, with video information, audio information, additional information such as program guide information, etc., each of which has been compressed digital information, being multiplexed in compliance with the MPEG-2 standard.

FIG. 2 conceptually illustrates the data structure of the "TS." The "TS" is in the form of a data sequence in which there are aligned a plurality of packets each called a transport stream packet (hereinafter, abbreviated as "TS packet") having a fixed length of 188 bytes.

The "TS" which is in the form of a plurality of TS packets, configured to contain Packetized Elementary Stream (PES) packets, and packets each called "section."

In each PES packet, there is stored a coded stream representative of a program content such as video information (video), audio information (audio), or data. In addition, in each section, there are stored information for identifying the type of a content (e.g., the type as to whether it is video or audio), an Electric Program Guide (EPG), information for identifying a broadcaster, a Copy Control Information (CCI) signal, etc.

The CCI signal is information for use in restricting the number of times that a user (e.g., a TV viewer) is authorized to copy each program content. More specifically, the CCI signal is formatted to contain information as to whether or not a broadcaster authorizes the user to copy program contents, and additionally contain information as to the number of times the user is authorized to copy program contents, where the broadcaster authorizes the user to copy program contents.

As illustrated in FIG. 1, the tuner unit 20 is configured to additionally include an EEPROM (Electrically Erasable Programmable Read-Only Memory) 46, and an encryptor 48.

In the present embodiment, the EEPROM 46, which is an example of a non-volatile memory, has previously stored therein a tuner-dependent unique key which is a key unique to the tuner unit 20. The tuner-dependent unique key is stored by a manufacturer who manufactures the tuner unit 20, prior to the sale of the tuner unit 20.

As is well known, the encryptor 48 encrypts a "TS" (in the form of digital data) inputted from the decoder 44, according to an algorithm dependent on a designated encryption key (in the present embodiment, as will be described in more detail later, the encryption key is designated by the PC 30), and transmits the encrypted data to the PC 30.

More specifically, prior to encryption, the encryptor 48 extracts a CCI signal from a "TS" inputted from the decoder 44. Subsequently, the encryptor 48 determines as to whether the extracted CCI signal indicates that the user is not authorized at all or is authorized only once, to copy a current broadcast program content, to thereby determine whether or not there is a need of encrypting digital data representative of a current broadcast program content. The encryptor 48, only if the encryptor 48 determines that there is a need of encryption, encrypts the digital data and transmits the encrypted digital data representative of the broadcast program content to the PC 30.

Still more specifically, as illustrated in FIG. 1, the encryptor 48, in response to issuance of a request from the PC 30, retrieves the tuner-dependent unique key from the EEPROM 46 and transmits the retrieved tuner-dependent unique key to the PC 30. Further, the encryptor 48 receives a combination-dependent unique key and control data from the PC 30. The combination-dependent unique key and the control data will be described in more detail later.

Additionally, the encryptor 48 encrypts a "TS" (digital data) inputted from the decoder 44, using a combination-dependent unique key intactly as a protection key or using a key uniquely assigned to the combination-dependent unique key as a protection key, and then outputs the encrypted data to the PC 30.

As illustrated in FIG. 1, the PC 30 is configured to include an interface (which is compliant with the USB 2.0 standard, for example) 50 and a bus 52, as is well known.

The aforementioned encrypted data and tuner-dependent unique key are transmitted from the tuner unit 20 to the PC 30 via the interface 50. The encryption prevents a user from unauthorized viewing and listening to and duplicating the data, even if the data (digital data representative of a broadcast program content) in the interface 50 is hacked. The aforementioned combination-dependent unique key and control data are transmitted from the PC 30 to the tuner unit 20 via the interface 50.

As illustrated in FIG. 1, the PC 30 is configured to include: a CPU (Central Processing Unit) 60 acting as a processor; a non-volatile main memory (e.g., a hard disc drive memory) 62 for storage of an operation program or application programs; a volatile RAM (Random Access Memory) 64; an I/O controller 68; a display controller 70; a sound controller 72; and a decryptor 76, all of which are coupled to the bus 52.

As illustrated in FIG. 1, the CPU 60 has previously stored therein a CPU_ID. The CPU_ID acts as a key unique to the individual CPU 60. In the main memory 62, there are stored various programs beginning with a broadcast-signal processing program which is conceptually illustrated in a flow chart in FIG. 3.

In the RAM 64, there are stored a computer-dependent unique key which is a key unique to the individual PC 30, the aforementioned combination-dependent unique key, and a MAC (Media Access Control) address. The combination-dependent unique key, as described above, is a key unique to a combination of the individual tuner unit 20 and the individual PC 30 to which the individual tuner unit 20 has been electrically coupled.

To the I/O controller 68, there are coupled: a keyboard 78 and a mouse 80, each of which acts as an input device; a storage 84 for use in storing a recorded video, etc.; and a CD drive 86. The CD drive 86 is used, for example, for reading the aforementioned broadcast-signal processing program from a CD-ROM 88 which has previously stored therein the broadcast-signal processing program, and installing the read broadcast-signal processing program in the PC 30.

Figure 4:
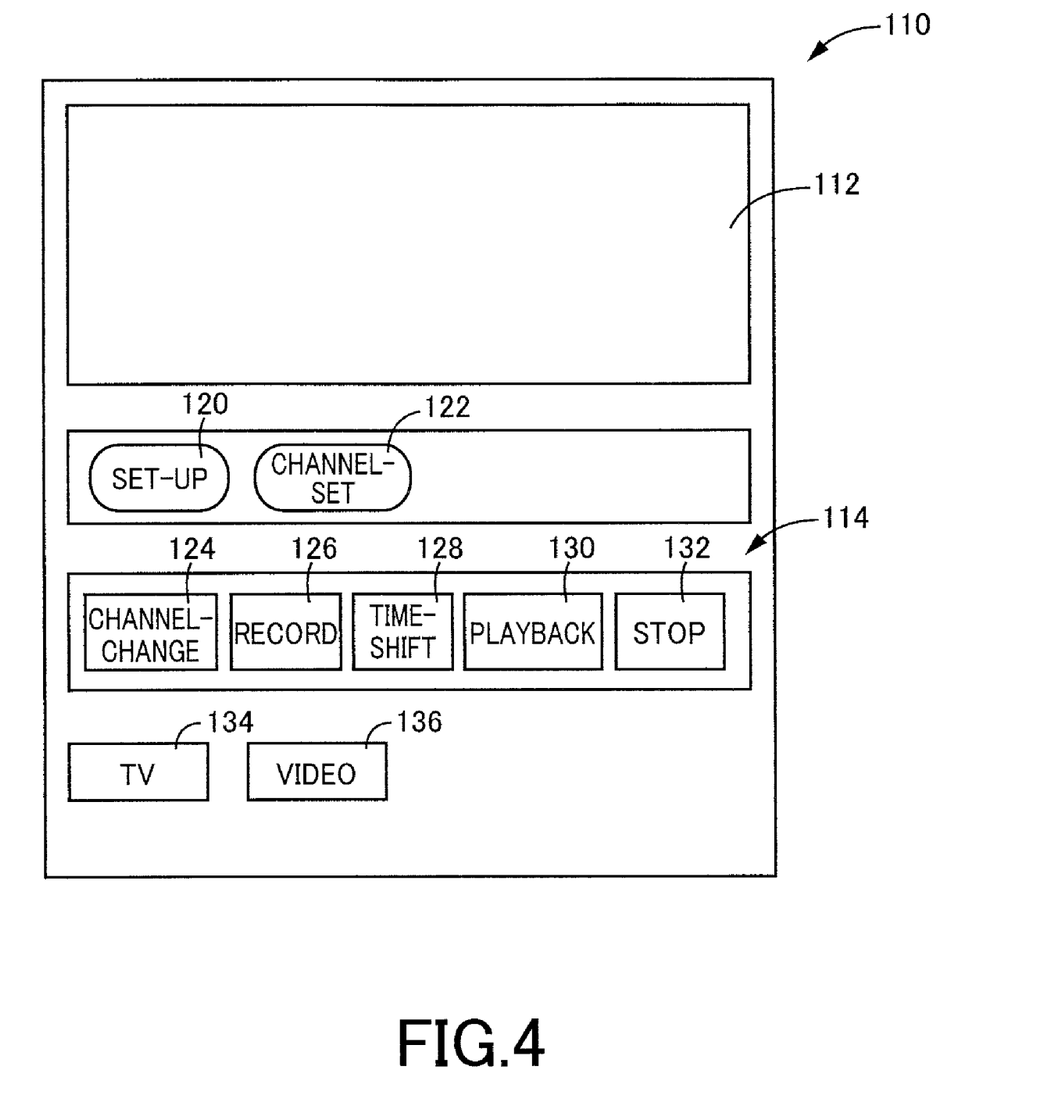
FIG. 4 is a front view illustrating an exemplary image displayed on a monitor for playing of a broadcast program content in the digital broadcast receiving-system depicted in FIG. 1.

To the display controller 70, there are coupled a VRAM (Video Random Access Memory) 92 which is for use in temporarily storing video information (video data), and a monitor (e.g., an LCD) 94. The video information (video data) is presented to a user via the monitor 94. FIG. 4 illustrates an example of a display screen which is displayed on the monitor 94 for allowing a user input for viewing a TV program via the monitor 94.

As illustrated in FIG. 1, to the sound controller 72, there is coupled a speaker 96 through which audio information (audio data) is presented to a user.

The decryptor 76 is caused to attempt decryption of an encrypted version of digital data representative of a broadcast program content, using a designated combination-dependent unique key, as an encryption key.

The decryptor 76 is adapted to perform a successful decryption of an encrypted version of digital data representative of a broadcast program content, only in the presence of a coincidence between an encryption key that was used for encryption of the digital data representative of the broadcast program content, and a current combination-dependent unique key that will be used for decryption of the same digital data. The resulting decrypted version of the digital data representative of the broadcast program content is formatted to contain the video data, the audio data, and the electric program guide information, all of which were stated above.

In addition, the decryptor 76 is further adapted not to perform a successful decryption of an encrypted version of digital data representative of a broadcast program content, in the absence of a coincidence between an encryption key that was used for encryption of the digital data representative of the broadcast program content, and a current combination-dependent unique key that will be used for decryption of the same digital data.

As illustrated in FIG. 1, in the PC 30, a decoder 100 is coupled to the bus 52 and the decryptor 76. The decoder 100 receives digital data from the decryptor 76. The decoder 100 is configured to allow digital data supplied from the decryptor 76 to be restored to original forms of video data and audio data. The restored video data is transmitted to the display controller 70 via the bus 52, while the restored audio data is transmitted to the sound controller 72 via the bus 52.

Figure 3:
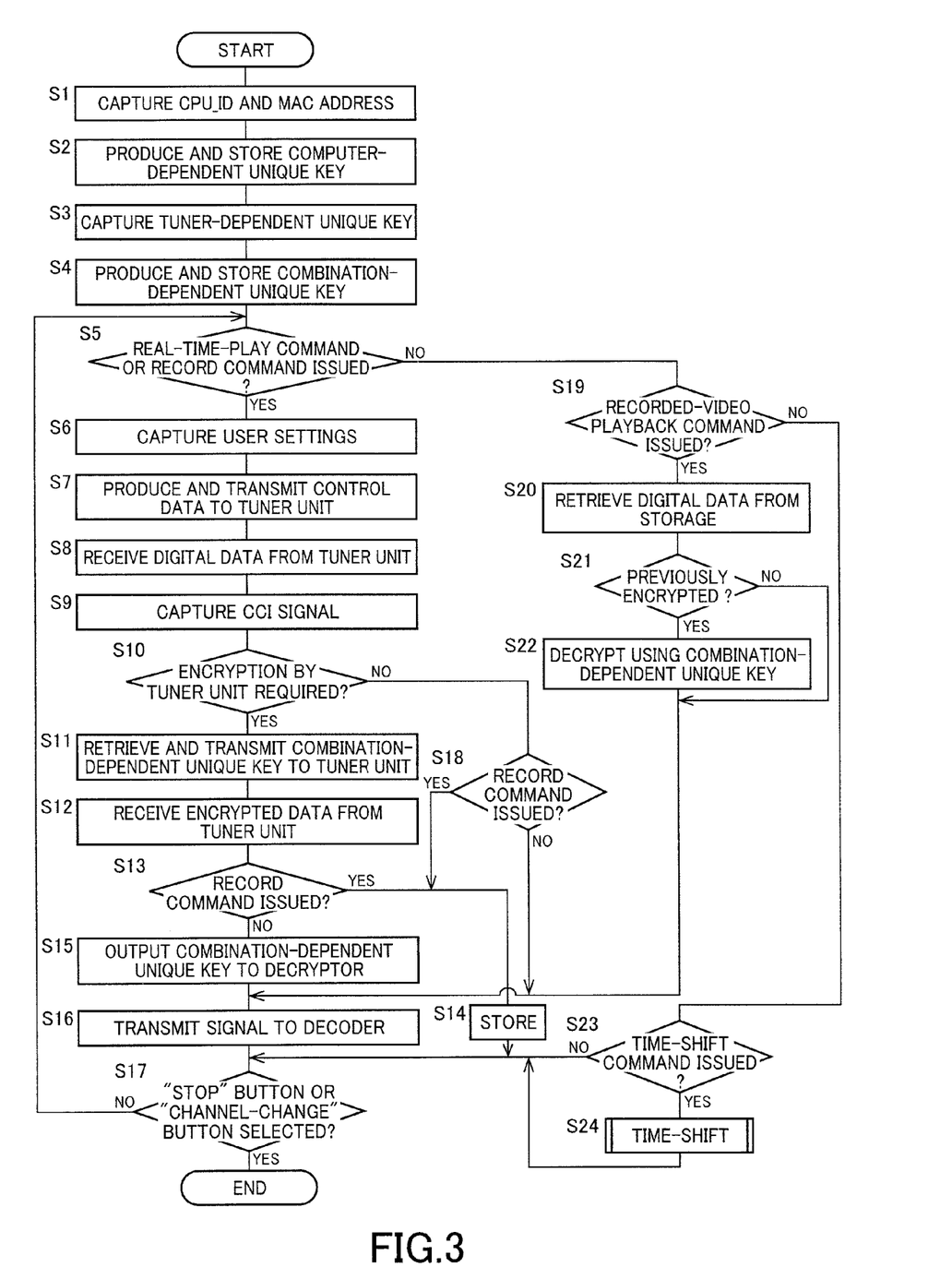
FIG. 3 is a flow chart conceptually illustrating a broadcast-signal processing program executed by a personal computer (PC) depicted in FIG. 1.

Referring next to FIG. 3, the aforementioned broadcast-signal processing program will be described in more detail. Prior to the description, there will be described, by referring to FIG. 4, a display screen 110 for use in playing a TV program, wherein the display screen 110 is displayed on the monitor 94 in response to activation of the broadcast-signal processing program in the PC 30.

As illustrated in FIG. 4, the display screen 110 for use in playing a TV program, is configured to contain a video display area 112 and a setting-panel area 114.

In the video display area 112, there are displayed the image of a TV program that is being viewed in real-time by a user, and/or the image of a previously-recorded video file.

In addition, the setting-panel area 114 is provided for allowing a user to set up the system or change the settings. In the setting-panel area 114, a "set-up" button 120 and a "channel-set" button 122 are displayed.

The "set-up" button 120 is pressed (e.g., selected using the mouse 80 or cursor keys in the keyboard 78) by a user to display a screen or page which allows the user to enter the desirable settings for playing of a TV program. In addition, the "channel-set" button 122 is manipulated by a user to display a screen or page which allows the user to set or select a channel which carries a user-desired TV program.

As illustrated in FIG. 4, in the setting-panel area 114, there are additionally displayed a "channel-change" button 124, a "record" button 126, a "time-shift" button 128, a "playback" button 130 and a "stop" button 132.

The "channel-change" button 124 is pressed by a user for allowing the user to change the channel of a user-desired TV program. The "record" button 126 is pressed by a user for allowing the user to initiate the recording of a user-desired TV program.

The "time-shift" button 128 is pressed by a user for starting recording of a portion of a currently viewed TV program for a shortened time, to thereby perform time-shift playback (i.e., time shifted play back). Once the time-shift playback mode starts, a live or on-the-air TV program is paused, while being continually recorded, and then played back the same TV program from the point of pause. This time-shift playback mode is disclosed in U.S. Pat. No. 7,095,945 which is incorporated hereinto by reference in its entirety.

The "playback" button 130 is pressed by a user for staring a mode for playing back a previously-recorded video file, wherein the mode is defined to include recorded-video playback (which means previously-recorded video playback commonly used in a narrow sense), and the aforementioned time-shift playback.

The "stop" button 132 is pressed by a user for stopping a currently-selected one of the real-time play (i.e., a mode for playing and viewing on-the-air TV programs in real-time), the recorded-video playback, and the time-shift playback.

As illustrated in FIG. 4, in the setting-panel area 114, a "TV" button 134 and a "video" button 136 are additionally displayed.

The "TV" button 134 is pressed by a user for performing the real-time play for viewing a selected on-the-air TV program in real-time, or recording a selected on-the-air TV program. In addition, the "video" button 136 is pressed by a user for playing back a previously-recorded video file (including a video file produced during the time-shift playback), that is to say, for performing a selected one of the recorded-video playback and the time-shift playback.

Next, referring back to FIG. 3, the aforementioned broadcast-signal processing program will be described.

The broadcast-signal processing program, which is activated in response to a user's action, begins with step S1 to capture the CPU_ID from the CPU 60, and the MAC address from the RAM 64. The MAC address is obtained at the power-on of the PC 30 and then stored in the RAM 64.

Next, at step S2, a computer-dependent unique key is produced which is unique to the combination of the captured CPU_ID and MAC address. In an example, the computer-dependent unique key is produced by employing a numeric string representative of the CPU_ID and a numeric string representative of the MAC address. The produced computer-dependent unique key is stored in the RAM 64.

Thereafter, at step S3, a tuner-dependent unique key is captured from the tuner unit 20 with the PC 30 being coupled to the tuner unit 20.

Subsequently, at step S4, a combination-dependent unique key is produced which is unique to the combination of a current computer-dependent unique key and a current tuner-dependent unique key. In an example, the combination-dependent unique key is produced by employing a numeric string representative of the computer-dependent unique key and a numeric string representative of the tuner-dependent unique key. The produced combination-dependent unique key is stored in the RAM 64 until a current cycle of execution of the broadcast-signal processing program terminates.

Thereafter, at step S5, a determination is made as to whether or not a user-selected mode is equal to either a real-time play mode for real-time viewing or a recording mode for later viewing. If so, then step S6 follows to enter the settings which have been defined by a user in conjunction with a current mode via the setting-panel area 114. In an example, the settings include the channel of a user-desirable TV program.

Subsequently, at step S7, the aforementioned control data is produced for transmission to the tuner unit 20. The control data is produced so as to include a command for instructing the tuner unit 20 to initiate reception of a broadcast signal representative of an on-the-air TV program, and a command for designating the number of a channel which is to be selected by the tuner unit 20. The produced control data is transmitted to the tuner unit 20.

Thereafter, at step S8, the PC 30 receives from the tuner unit 20, as a "TS," digital data representative of a broadcast program content which has been received by the tuner unit 20 for the selected channel.

Subsequently, at step S9, the PC 30 captures a current CCI signal from the tuner unit 20. Thereafter, at step S10, a determination is made as to whether or not the captured CCI signal either indicates that a current broadcast program content is not authorized to be copied at all, or indicates that the current broadcast program content is authorized to be copied only once, thereby determining whether or not there is a need of encryption of digital data representative of the current broadcast program content, using the tuner unit 20.

If there is a need of encryption by the tuner unit 20, then, prior to the prospected encryption, step S10 follows to retrieve the combination-dependent unique key from the RAM 64 and transmit it to the tuner unit 20. Thereafter, at step S12, the PC 30 receives from the tuner unit 20, digital data which has been encrypted by the tuner unit 20 using the combination-dependent unique key.

Subsequently, at step S13, a determination is made as to whether or not the current mode is equal to the recording mode. If so, then step S14 follows to store the received encrypted data in the storage 84. Thereafter, step S17 follows.

In contrast, if the current mode is not equal to the recording mode, then step S15 follows to output the current combination-dependent unique key to the decryptor 76, and additionally output a signal to the decyptor 76 which instructs the decryptor 76 to attempt decryption of the encrypted digital data representative of the current broadcast program content, using the outputted combination-dependent unique key.

Subsequently, at step S16, the decoder 100 receives an output signal of the decryptor 76 (i.e., a signal having not required decryption, a signal having been successfully decrypted, or a signal having been failed in successful decryption).

In either case, step S17 follows to make a determination as to whether or not the user pressed either the "stop" button 132 or the "channel-change" button 124. If so, then one cycle of execution of this broadcast-signal processing program terminates; however, if not, then step S5 follows.

While this broadcast-signal processing program has been described above about operations performed when there is a need of encryption by the tuner unit 20, this broadcast-signal processing program is executed when there is not a need of encryption by the tuner unit 20, such that step S18 is implemented to make a determination as to whether or not the current mode is equal to the recording mode. If so, the step S14 follows; however, if not, then step S16 follows to transmit to the decoder 100, the signal which has been outputted from the tuner unit 20 (i.e., digital data which has not been encrypted).

The decoder 100, in operation, as described above, restores digital data representative of a broadcast program content, to original forms of visual data and audio data. The restored visual data is transmitted to the display controller 70 via the bus 52, while the restored audio data is transmitted to the sound controller 72 via the bus 52.

While this broadcast-signal processing program has been described above about operations performed when the current mode is equal to either the real-time play mode or the recording mode, this broadcast-signal processing program is executed when the current mode is equal to none of the real-time play mode and the recording mode, such that step S19 is implemented to make a determination as to whether or not the current mode is equal to the recorded-video playback mode.

If the current mode is equal to the recorded-video playback mode, then step S20 follows to retrieve digital data (i.e., a previously-recorded video file) from the storage 84 as recorded-video data. Subsequently, at step S21, a determination is made as to whether or not the recorded-video data is encrypted data, by referring to the retrieved recorded-video data.

If the retrieved recorded-video data is encrypted data, then step S22 follows to capture the combination-dependent unique key from the RAM 64, to output to the decryptor 76 the captured combination-dependent unique key as an encryption key, and to instruct the decryptor 76 to attempt decryption of the retrieved recorded-video data.

Subsequently, step S16 follows to transmit an output signal of the decryptor 76 to the decoder 100.

If, however, the retrieved recorded-video data is not encrypted data, then step S22 is skipped and step S16 follows.

While this broadcast-signal processing program has been described above about operations performed when the current mode is equal to the recorded-video playback mode, this broadcast-signal processing program is executed when the current mode is not equal to the recorded-video playback mode, such that step S23 is implemented to make a determination as to whether or not the user pressed the "time-shift" button 128 for the time-shift playback to be performed.

If so, then step S24 follows to execute a subroutine (not shown) for the time-shift playback. More specifically, if the user pressed the "time-shift" button 128, then steps equivalent to steps S6-S16 are implemented in a similar manner to that used when the recording mode is selected.

At a step equivalent to step S14, however, a broadcast program content is sequentially stored in a memory (e.g., a cache, although not shown) used for performing the time-shift playback, until the user presses the "playback" button 130 subsequently. The memory is separate from a memory used for the recording mode.

If, eventually, the user presses the "playback" button 130, then steps equivalent to steps S20-S22 are in turn implemented in a manner similar to that used when the recorded-video playback mode is selected. At a step equivalent to step S20, however, a desired broadcast program content is retrieved from the aforementioned memory used for the time-shift playback.

If the implementation of step S24 is completed, then step S17 follows.

As will be evident from the foregoing explanation, for the present embodiment, it can be considered for illustrative purposes that, the PC 30 constitutes an example of the "computer unit" set forth in each of the first and second aspects of the invention, that the tuner 42 constitutes an example of the "receiver" set forth in each of the first and second aspects of the invention, that the encryptor 48 constitutes an example of the "encryptor" set forth in each of the first and second aspects of the invention, that the storage 84 constitutes an example of the "data storage" set forth in each of the first and second aspects of the invention, and that the monitor 94 and the speaker 96 each constitute an example of the "playing device" set forth in each of the first and second aspects of the invention.

Further, for the present embodiment, it can be considered for illustrative purposes that, steps S1-S12 and steps S14-S17 constitute an example of the "step of playing the broadcast program content in real-time" set forth in the first aspect of the invention, and that steps S1-S4 constitute an example of the "step of producing the combination-dependent unique key" set forth in the first aspect of the invention.

Still further, for the present embodiment, it can be considered for illustrative purposes that, steps S1-S18 constitute an example of the "step of playing back" set forth in the second aspect of the invention, and that steps S1-S4 constitutes an example of the "step of producing the combination-dependent unique key" set forth in the second aspect of the invention.

Yet further, for the present embodiment, it can be considered for illustrative purposes that, the broadcast-signal processing program illustrated in FIG. 3 constitutes an example of the "program" according to the aforementioned eleventh mode of the invention, and that the CD-ROM 88 constitutes an example of the "medium" according to the aforementioned twelfth mode of the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method, implemented by a computer unit, for playing a broadcast program content, in an environment where the computer unit allows the broadcast program content to be viewed and/or listened to, with a tuner unit detachably coupled to the computer unit via an interface, the method comprising:
   performing, at the tuner unit, the steps of:
      receiving, at a wireless or wired receiver, a broadcast signal representative of the broadcast program content;
      encrypting, at an encryptor, the broadcast signal received by the receiver according to an algorithm dependent on a designated key;
      outputting the encrypted broadcast signal as encrypted data; and
      storing, at a key storage, a tuner-dependent unique key which is an encryption key unique to the tuner unit, the tuner-dependent unique key being generated within the tuner unit, and
   performing, at the computer unit, the steps of:
      decrypting, at a decryptor, the encrypted data according to an algorithm dependent on a designated key;
      storing, at a data storage, data;
      playing, at a playing device, data;
      producing a combination-dependent unique key which is unique to a combination of the tuner unit and the computer unit; and
   in response to issuance of a real-time play command from a user, playing the broadcast program content in real-time after transmission thereof from the tuner unit to the computer unit,
   wherein the producing includes:
      capturing the tuner-dependent unique key from the tuner unit via the interface;
      obtaining a computer-dependent unique key which is unique only to the computer unit; and
      generating the combination-dependent unique key, from the tuner-dependent unique key and the computer-dependent unique key, and
   wherein the playing the broadcast program includes:
      in response to issuance of the real-time play command, implementing the step of producing;
      outputting to the encryptor via the interface, the combination-dependent unique key obtained in the step of producing;
      inputting via the interface, encrypted digital data output from the encryptor in response to the output of the combination-dependent unique key to the encryptor;
      causing the decryptor to attempt decryption of the inputted encrypted digital data, using the produced combination-dependent unique key; and
      outputting to the playing device, a decrypted version of the digital data resulting from successful decryption by the decryptor.

2. A method, implemented by a computer unit, for playing a broadcast program content, in an environment where the computer unit allows the broadcast program content to be viewed and/or listened to, with a tuner unit detachably coupled to the computer unit via an interface, the method comprising:

performing, at the tuner unit, the steps of:
receiving, at a wireless or wired receiver, a broadcast signal representative of the broadcast program content;
encrypting, at an encryptor, the broadcast signal received by the receiver according to an algorithm dependent on a designated key; and
outputting the encrypted broadcast signal as encrypted data; and
storing, at a key storage, a tuner-dependent unique key which is an encryption key unique to the tuner unit, the tuner-dependent unique key being generated within the tuner unit, and performing, at the computer unit, the steps of:
decrypting, at a decryptor, the encrypted data according to an algorithm dependent on a designated key;
storing, at a data storage, data; and
playing, at a playing device, data;
producing a combination-dependent unique key which is unique to a combination of the tuner unit and the computer unit;
in response to issuance of a record command from a user, storing digital data inputted from the tuner unit, in the data storage, as recorded data; and
in response to issuance of a recorded-video playback command from the user, playing back the recorded data after retrieval thereof from the data storage, wherein the producing includes:
capturing the tuner-dependent unique key from the tuner unit via the interface;
obtaining a computer-dependent unique key which is unique only to the computer unit; and
generating the combination-dependent unique key, from the tuner-dependent unique key and the computer-dependent unique key, wherein the storing digital data includes:
in response to issuance of the record command, implementing the step of producing;
outputting to the encryptor via the interface, the combination-dependent unique key obtained in the step of producing;
inputting via the interface, encrypted digital data output from the encryptor in response to the output of the combination-dependent unique key to the encryptor; and
storing the inputted digital data in the data storage, as the recorded data, and wherein the playing back the recorded data includes:
in response to issuance of the recorded-video playback command, retrieving the recorded data from the data storage, and implementing the step of producing;
causing the decryptor to attempt decryption of the inputted retrieved recorded-data, using the combination-dependent unique key produced as a result of the implementation of the step of producing; and
outputting to the playing device, a decrypted version of the recorded data resulting from successful decryption by the decryptor.

3. The method according to claim 1, wherein the playing the broadcast program includes implementing the producing, during only an initial part of a length of a real-time play period corresponding to a single real-time play command issued from the user, and of reserving the combination-dependent unique key produced as a result of the implementation of the producing, until expiration of the real-time play period.

4. The method according to claim 1, wherein the playing the broadcast program includes implementing the producing periodically, during only an initial part of a length of a real-time play period corresponding to a single real-time play command issued from the user, to thereby produce the combination-dependent unique key periodically.

5. The method according to claim 2, wherein the playing the broadcast program includes implementing the producing, during only an initial part of a length of a recorded-video playback period corresponding to a single recorded-video playback command issued from the user, and of reserving the combination-dependent unique key produced as a result of the implementation of the producing, until expiration of the recorded-video playback period.

6. The method according to claim 2, wherein the playing the broadcast program includes implementing the producing periodically, during only an initial part of a length of a recorded-video playback period corresponding to a single recorded-video playback command issued from the user, to thereby produce the combination-dependent unique key periodically.

7. The method according to claim 1, wherein
the computer unit includes a CPU (Central Processing Unit) and a MAC (Media Access Control),
the CPU is assigned a CPU-dependent unique ID unique to the CPU,
the MAC is assigned a MAC address unique to the MAC, and
the producing includes producing the computer-dependent unique key from at least one of the CPU-dependent unique ID and the MAC address.

8. The method according to claim 2, wherein
the computer unit includes a CPU (Central Processing Unit) and a MAC (Media Access Control),
the CPU is assigned a CPU-dependent unique ID unique to the CPU,
the MAC is assigned a MAC address unique to the MAC, and
the producing includes producing the computer-dependent unique key from at least one of the CPU-dependent unique ID and the MAC address.

9. The method according to claim 1, wherein the broadcast signal is formulated such that a content information signal is embedded in the broadcast signal representative of content information that relates to the broadcast program content defined by the broadcast signal, and
the method further comprises:
determining whether there is a need for causing the encryptor to encrypt the broadcast signal prior to transmission of the broadcast signal from the tuner unit into the computer unit,
wherein the determining further includes:
extracting the content information signal from the broadcast signal; and
determining whether there is the need based on the extracted content information signal.

10. The method according to claim 9, wherein the content information signal is formulated to include a copy management information signal embedded in the broadcast signal, the copy management information signal being representative of a status as to whether a user is authorized to copy the broadcast program content, or a number of times that a user is authorized to copy the broadcast program content.

11. The method according to claim 10, wherein the broadcast signal is formulated to include a transport stream and the copy management information signal is formulated to include a CCI (Copy Control Information) signal previously embedded in the transport stream.

12. The method according to claim 9, wherein the playing the broadcast program includes inputting, upon determination that there is not the need, digital data outputted via the interface from the tuner unit in a non-encrypted format, and outputting the inputted digital data to the playing device, without implementing the producing.

13. The method according to claim 2, wherein the broadcast signal is formulated such that a content information signal is embedded in the broadcast signal representative of content information that relates to the broadcast program content defined by the broadcast signal, and the method further comprises:
determining whether there is a need for causing the encryptor to encrypt the broadcast signal prior to transmission of the broadcast signal from the tuner unit into the computer unit,
wherein the determining further includes:
extracting the content information signal from the broadcast signal; and
determining whether there is the need based on the extracted content information signal.

14. The method according to claim 13, wherein the content information signal is formulated to include a copy management information signal embedded in the broadcast signal, the copy management information signal being representative of a status as to whether a user is authorized to copy the broadcast program content, or a number of times that a user is authorized to copy the broadcast program content.

15. The method according to claim 14, wherein the broadcast signal is formulated to include a transport stream, and the copy management information signal is formulated to include a CCI (Copy Control Information) signal previously embedded in the transport stream.

16. The method according to claim 15, wherein the playing the broadcast program includes inputting, upon determination that there is not the need, digital data outputted via the interface from the tuner unit in a non-encrypted format, and outputting the inputted digital data to the playing device, without implementing the producing.

17. The method according to claim 2, wherein the playing back the recorded data includes determining whether recorded data stored in the data storage is encrypted, and, upon determination that the recorded data is encrypted, retrieving the recorded data from the data storage and outputting the retrieved recorded-data to the playing device, without implementing the producing or causing the decryptor to decrypt the recorded data.

18. A non-transitory computer readable medium having stored therein computer readable instructions which when executed by a computer cause the computer to perform the method according to claim 1.

19. A non-transitory computer readable medium having stored therein computer readable instructions which when executed by a computer cause the computer to perform the method according to claim 2.

20. The method according to claim 1, wherein the tuner unit and the computer unit are interconnected in a one-to-one relationship.

21. The method according to claim 1, wherein the producing includes producing the combination-dependent unique key by employing a numeric string representative of the tuner-dependent unique key and a numeric string representative of the computer-dependent unique key.

22. A broadcast system for playing a broadcast program content in an environment where a computer unit allows the broadcast program content to be viewed and/or listened to, comprising:

a tuner unit detachably coupled to the computer unit via an interface, the tuner unit including
a wireless or wired receiver that receives a broadcast signal representative of the broadcast program content,
an encryptor that encrypts the broadcast signal received by the receiver according to an algorithm dependent on a designated key, and outputs the encrypted broadcast signal as encrypted data, and
a key storage that stores a tuner-dependent unique key which is an encryption key unique to the tuner unit, the tuner-dependent unique key being generated within the tuner unit; and
the computer unit including
a decryptor that decrypts the encrypted data according to an algorithm dependent on a designated key,
a data storage that stores data, and
a playing device that plays data,
wherein the computer unit
produces a combination-dependent unique key which is unique to a combination of the tuner unit and the computer unit, the producing including
capturing the tuner-dependent unique key from the tuner unit via the interface;
obtaining a computer-dependent unique key which is unique only to the computer unit, and
generating the combination-dependent unique key, from the tuner-dependent unique key and the computer-dependent unique key, and
in response to issuance of a real-time play command from a user, plays the broadcast program content in real-time after transmission thereof from the tuner unit to the computer unit, the playing of the broadcast program including
in response to issuance of the real-time play command, implementing the step of producing,
outputting to the encryptor via the interface, the combination-dependent unique key,
inputting via the interface, encrypted digital data output from the encryptor in response to the output of the combination-dependent unique key to the encryptor,
causing the decryptor to attempt decryption of the inputted encrypted digital data, using the produced combination-dependent unique key, and
outputting to the playing device, a decrypted version of the digital data resulting from successful decryption by the decryptor.

* * * * *